(12) United States Patent
Klimko et al.

(10) Patent No.: US 6,912,447 B2
(45) Date of Patent: Jun. 28, 2005

(54) SYSTEM AND METHOD FOR DETERMINING WELD PROCEDURES

(75) Inventors: Robert Klimko, Peoria, IL (US); Nicolas G. Ladji, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 86 days.

(21) Appl. No.: 10/327,730

(22) Filed: Dec. 23, 2002

(65) Prior Publication Data

US 2004/0122550 A1 Jun. 24, 2004

(51) Int. Cl.⁷ ............................................. G06F 19/00
(52) U.S. Cl. ..................... 700/212; 219/85.1; 228/51
(58) Field of Search ................................. 700/212, 111, 700/108; 219/617, 663, 664, 54, 73.21, 76.1, 85.1, 85.16; 228/51–55

(56) References Cited

U.S. PATENT DOCUMENTS

| 3,654,616 | A | | 4/1972 | Dunne et al. |
|---|---|---|---|---|
| 4,447,698 | A | | 5/1984 | Van Sikle et al. |
| 6,051,805 | A | * | 4/2000 | Vaidya et al. .......... 219/130.01 |
| 6,072,145 | A | | 6/2000 | Suita et al. |
| 6,414,259 | B2 | * | 7/2002 | Kanjo ........................ 219/91.2 |
| 6,636,776 | B1 | * | 10/2003 | Barton et al. ................ 700/169 |
| 2002/0065790 | A1 | * | 5/2002 | Oouchi ........................ 705/400 |
| 2003/0074329 | A1 | * | 4/2003 | Jandasek et al. .............. 705/80 |
| 2004/0073469 | A1 | * | 4/2004 | Emori et al. ..................... 705/8 |
| 2004/0083010 | A1 | * | 4/2004 | Nagata et al. .................. 700/1 |

* cited by examiner

Primary Examiner—Leo Picard
Assistant Examiner—Zoila Cabrera
(74) Attorney, Agent, or Firm—Howard & Howard

(57) ABSTRACT

A system (100), method (200, 400, 600), or computer program product (300, 500, 700) is used to develop a set of weld procedures for welding first and second parts is provided. A desired weld associated with the first and second parts is established. A set of weld parameters is established as a function of the desired weld and the set of weld procedures are established as a function of the weld parameters.

73 Claims, 7 Drawing Sheets

SYSTEM AND METHOD FOR DETERMINING WELD PROCEDURES

TECHNICAL FIELD

The present invention relates generally to welding, and more particularly, to a system and method for determining weld procedures.

BACKGROUND

Frequently, the manufacture of equipment requires that components of a portion of the equipment must be welded together. Based on the nature of the equipment, its use, the environment that the equipment will be used in, the weld must meet several design specifications. Additionally, the weld specifications may be limited by the manner in which the two parts to be weld fit together.

The equipment may be designed by a design engineer, who designs the part to meet specified design requirements. The design requirements may specify or require a specific weld, i.e., weld type and parameters.

Thus, the equipment may be built or assembled using the specified weld. However, the design engineer usually does not consider how the weld is to be performed, e.g., the steps that must be performed to weld the two parts together. The steps may include locate or positioning of parts, the performance of partial welds or welds completed in a number of passes so that the parts do not become malformed. Additionally, the design engineer may not recognize the time required to perform a given weld. All of this may be considered in budgeting for the manufacture of the equipment, as well as determining how much equipment and how many welders (persons or robots) will be required to manufacture the equipment (taking into account actual or estimated numbers of equipment to be manufactured).

Generally, the steps to perform a given weld must be worked out manually. The steps are generated based on the parts to be weld (including the geometry of the parts, weight, etc. . . . ), the specified weld, and the design requirements. These steps are usually generated by a weld expert who must compile all of the required information and manually generate the steps which are then followed by the welder or welders during manufacture of the equipment. This tends to be a cumbersome, lengthy, expensive, and sometimes unreliable process.

The present invention is aimed at overcoming one or more of the promises identified above.

SUMMARY OF THE INVENTION

In a first aspect of the present invention, a method for developing a set of weld procedures for welding first and second parts is provided. The method includes the steps of establishing a desired weld associated with the first and second parts, establishing a set of weld parameters as a function of the desired weld, and automatically establishing the set of weld procedures. The method further includes the steps of establishing a burden time associated with the set of weld procedures and establishing a cost associated with the set of weld procedures as a function of the burden time.

In a second aspect of the present invention, a computer based system for developing a set of weld procedures for welding first and second parts is provided. The system includes a database for storing weld information and a processing unit coupled to the database. The processing unit establishes a desired weld associated with the first and second parts, establishes a set of weld parameters, and automatically establishes the set of weld procedures as a function of the desired weld and the weld parameters. The processing unit also establishes a burden time associated with the set of weld procedures and establishes a cost associated with the set of weld procedures as a function of the burden time.

In a third aspect of the present invention, a computer program product for developing a set of weld procedures for welding first and second parts is provided. The computer program product includes computer readable program code means for establishing a desired weld associated with the first and second parts, computer readable program code means for establishing a set of weld parameters as a function of the desired weld, and computer readable program code means for automatically establishing the set of weld procedures as a function of the desired weld and the weld parameters. The computer program product further includes computer readable program code means for establishing a burden time associated with the set of weld procedures and computer readable program code means for establishing a cost associated with the set of weld procedures as a function of the burden time.

In a fourth aspect of the present invention, a method for developing a set of weld procedures for welding first and second parts is provided. The method includes the steps of establishing at least one drawing of the first and second parts, graphically establishing a desired weld associated with the first and second parts on the at least one drawing, automatically establishing a set of weld parameters as a function of the desired weld, and automatically establishing the set of weld procedures associated with the desired weld and the weld parameters.

In a fifth aspect of the present invention, a system for developing a set of weld procedures for welding first and second parts is provided. The system includes a depository of engineering drawings and a processing unit coupled to the depository. The processing unit establishes at least one drawing of the first and second parts, graphically establishes a desired weld associated with the first and second parts on the at least one drawing, automatically establishes a set of weld parameters as a function of the desired weld, and automatically establishes the set of weld procedures associated with the desired weld and the weld parameters.

In a sixth aspect of the present invention, a computer program product for developing a set of weld procedures for welding first and second parts is provided. The computer program product includes computer readable program code means for establishing at least one drawing of the first and second parts, computer readable program code means for graphically establishing a desired weld associated with the first and second parts on the at least one drawing, computer readable program code means for automatically establishing a set of weld parameters as a function of the desired weld, and computer readable program code means for automatically establishing set of weld procedures associated with the desired weld and the weld parameters.

In a seventh aspect of the present invention, a method for developing a set of weld procedures for welding first and second parts is provided. The method includes the steps of establishing a desired weld associated with the first and second parts, establishing a set of weld parameters as a function of the desired weld, establishing a preliminary set of weld procedures as a function of the desired weld and the weld parameters, and modifying at least one item of the procedures. The method further includes the step of analyzing the modified item as a function of a set of established weld guidelines.

In an eighth aspect of the present invention, a computer program product for developing a set of weld procedures for welding first and second parts is provided. The computer program product includes computer readable program code means for establishing a desired weld associated with the first and second parts, computer readable program code means for establishing a set of weld parameters as a function of the desired weld, computer readable program code means for establishing a preliminary set of weld procedures as a function of the desired weld and the weld parameters, computer readable program code means for modifying at least one item of the weld procedures and computer readable program code means for analyzing the modified item as a function of a set of established weld guidelines.

DETAILED DESCRIPTION

With reference to the drawings and in operation, the present invention provides a system 100, a method 200, 400, 600 and a computer program product 300, 500, 700 for developing a set of weld procedures for welding first and second parts.

The first and second parts may be part of a larger construct or assembly. The parts may be associated with any type of assembly or product having two or more parts that are to be welded. For example, the assembly may be a boom or chassis component of an earthmoving machine (not shown). During the design of the construct, the engineer or designer, may specify a desired weld and/or weld parameters for connecting the first and second parts together. As discussed below, the desired weld may be established by the designer by specifying certain weld parameters or by graphically identifying the type and location of the desired weld.

Figure 1:
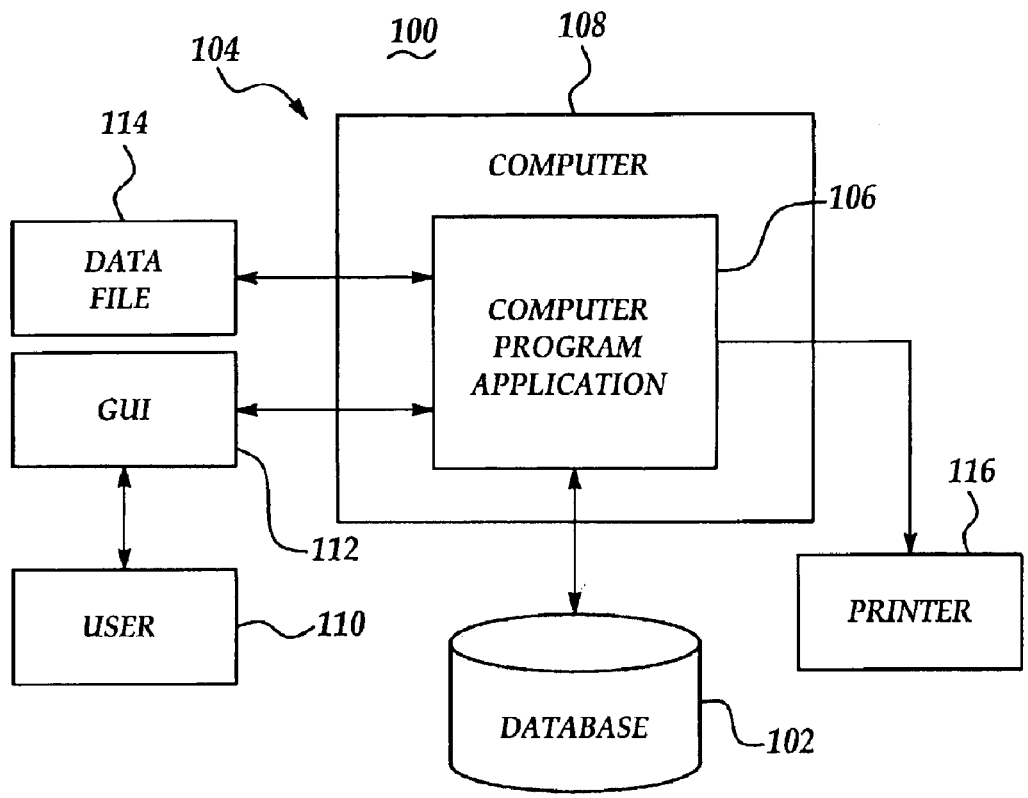
FIG. 1 is a diagrammatic illustration of a system for establishing a set of weld procedures, according to an embodiment of the present invention.

In one aspect of the present invention, the desired weld may be established using the computer system 100, such as the one in FIG. 1. The computer system 100 includes a database 102 for storing weld related information and a processing unit 104 coupled to the database 102. The processing unit 104 may be adapted to run a computer program application 106 in a conventional manner. In one embodiment, the processing unit 104 includes a stand-alone computer 108 operable by a user or weld expert 110 through a graphical user interface (GUI) 112.

In another embodiment, the computer 108 is part of a computer network, such as the internet (not shown). The GUI 112 may be run on a second computer (not shown) connected to the network. The GUI 112 may be implemented via a web enabled browser computer program, such as Microsoft Internet Explorer.

As explained below, the database 102 may include information related to the parts to be welded together, the weld processes, weld types, and welding operators. The database 102 may also be used to store the weld procedures developed (see below).

A separate depository or data file 114 may also be coupled to the processing unit 104. The data file 114 may contain engineering drawings related to the construct or the parts to be welded together. The data file 114 may be a computer aided engineering system which is used to produce and/or store engineering drawings.

A printer 116 may also be coupled to the processing unit 104 to all reports to be generated, such as generated weld procedures.

In a first aspect of the present invention the computer based system 100 may be used to develops a set of weld procedures for first and second parts. Using the GUI 112 of the processing unit 104, the user 110 may establish a set of weld parameters as a function of the desired weld and the weld information contained in the database 102. The processing unit 104 automatically establishes the set of weld procedures as a function of the desired weld and the weld parameters. The processing unit 104 may also establish a burden time associated with the set of weld procedures. The burden time is determined as a function of the set of weld procedures and establishes the time required to complete the weld operation. The processing unit 104 may also establish a cost associated with the set of weld procedures as a function of the burden time. For example, the estimated cost may be calculated by the burden time multiplied by the hourly rate of the welder(s), plus the material cost. The system 100 may also compare the cost of having a human welder perform the weld or a robot perform the weld. Thus, the costs may be compared and the most cost effective welder may be suggested.

In one embodiment of the present invention, the cost is determined as a function of an estimated material cost and an estimated labor cost.

In one aspect of the present invention, the designer may specify the type of weld desired. The user 110 may establish the weld type and associated geometric parameters of the weld type using the graphical user interface 112. In one embodiment, the processing unit 104 may determine a number of weld passes as a function of the geometric parameters. The processing unit 104 may also determine a volume associated with the desired weld as a function of the geometric parameters. The processing unit 104 may further determine a calculated volume per pass as a function of the number of weld passes and the volume associated with the desired weld.

Figure 8:
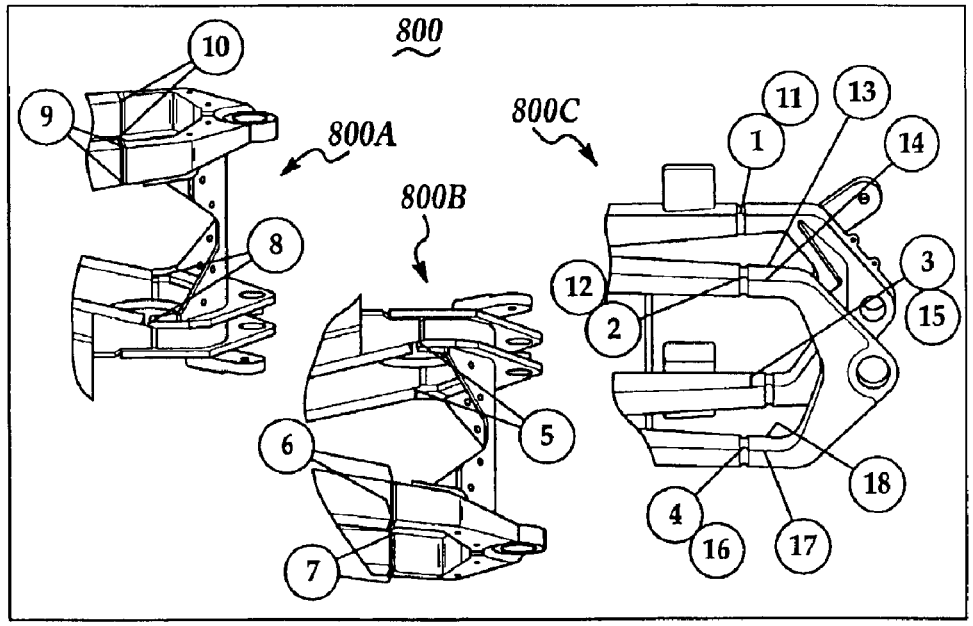
FIG. 8 is a diagrammatic illustration of a plurality of images associated with a set of weld procedures.

In one embodiment of the present invention, the user 110 may highlight the are to be welded, e.g., by placing a balloon identifier (see FIG. 8). The user 110 may then enter characteristics or parameters of the weld using a user interface (see below). The weld parameters may be related to weld type, weld length, weld thickness, material to be welded, weld filler, etc. . . . The system 100 may then generate the instructions or procedures for the weld to follow in order to achieve the desired weld. As discussed below, the weld procedures may include drawings of the parts, the locations used in the weld procedures, the number of passes needed to perform the weld and the type of weld process to use. The weld parameters may be used to access a repository of rules or standard in the database 102 that are used to generate the weld procedures.

In another aspect of the present invention, the processing unit 104 may be adapted to establish an intermittent parameter of the desired weld. In one embodiment, the intermittent parameter is none (no intermittent weld), a one sided intermittent weld, a two sided intermittent weld, or a staggered intermittent weld.

In one aspect of the present invention, the set of weld parameters includes a weld process type, for example, a bevel weld (BW).

With reference to FIG. 8, in one embodiment of the present invention, the processing unit 104 the weld procedures include at least one image 800 associated with the first and second parts. In the illustrated embodiment, the weld procedures include first, second, and third images 800A, 800B, 800C. Each image 800A 800B, 800C includes reference numbers (1-18 in the illustrated embodiment).

In one aspect of the present invention, the processing unit 104 may be utilized to establish the images 800. For example as discussed above, the data file 114 may include engineering drawings. The user 110, through the GUI 112, may retrieve engineering drawings of the first and second parts from the date file 114. The user 110 may add reference numbers and incorporate the engineering drawings or portions thereof into the weld procedures.

In one embodiment of the present invention, the set of weld procedures includes one or more weld items. The weld items may be organized into sequences, where each sequence may include a weld item or other action (see below).

Each weld item may be associated with a reference number. Each sequence includes a description of an action to be performed by the welder, e.g., locate a reference point, rotate, position or a weld item. The action may include additional information related to the actions contained therein, such as weld parameters. In one embodiment the reference numbers may be associated with the one or more of the weld items. In another embodiment, the reference numbers may be associated with one or more of the weld items and/or one or more of the other actions.

For example, the weld procedures for the set of images 800 shown in FIG. 8 may be as follows.

| Sequence | Description (Items) |
|---|---|
| 1. | Locate first part. Place in positioner. Rotate assembly by machine |
| 2. | Weld item 1 (7 passes and 15% of volume, weld incomplete). Root pass, Volume equal to 10 mm fill. Weld item 2 (4 passes and 15% of volume, weld incomplete). Root pass, volume equal to 10 mm fill. |
| 3. | Weld item 3 (7 passes and 15% of volume, weld incomplete). Root pass, volume equal to 10 mm file. Weld item 4 (4 passes and 15% of volume, weld incomplete). Root pass, volume equal to 10 mm fill. |
| 4. | Rotate assembly by machine. 90 degrees, RH rail up. |
| 5. | Weld item 5 (8 passes each, 2 places and dam one end). Bridge end of 33 mm bevels. |
| 6. | Weld item 6 (4 passes each, 2 places and dam one end). Weld item 7 (4 passes each, 2 places and dam one end). Bridge ends of 16 mm Jgrooves. |
| 7. | Rotate assembly by machine. 180 degrees, LH rail up. |
| 8. | Weld item 8 (8 passes each, 2 places and dam one end). |
| 9. | Weld item 9 (4 passes each, 2 places and dam one end). Weld item 10 (4 passes each, 2 places and dam one end). Bridge ends of 16 mm Jgrooves. |
| 10. | Rotate assembly by machine. 90 degrees, upper hitch facing up. |
| 11. | Weld item 11 (7 passes and 85% of volume, weld complete). Weld item 12 (4 passes and 85% of volume, weld complete). Buff welds, Grind Jgroove flush. |
| 12. | Weld item 13. Weld item 14 (2 passes). |
| 13. | Weld item 15 (7 passes and 85% of volume, weld complete). Weld item 16 (4 passes and 85 of volume, weld complete). Buff welds. Grind Jgroove flush). |
| 14. | Weld item 17. Weld item 18 (2 passes). |

In another aspect of the present invention, the processing unit 104 may be adapted to establish an operator to perform each weld item. In one embodiment of the present invention, a human operator or a robot operator may be designated.

In one aspect of the present invention, the processing unit 104 is adapted to determine a cost as a function of an estimated material cost and an estimated labor cost, the estimated labor cost being a function of the established operator. As discussed below, based on the weld procedures, the processing unit 104 determines as estimated material cost and an estimate labor cost. The cost associated with performing the weld is a function of the estimated material cost and the estimated labor cost.

Figure 9:
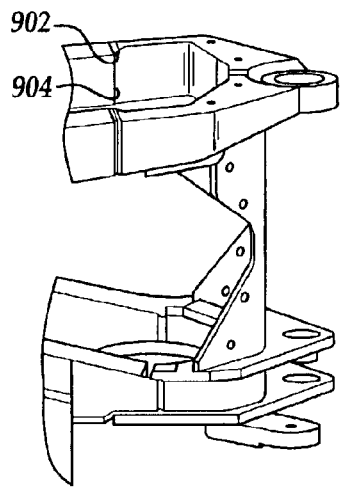
FIG. 9 is a drawing of at least a portion of first and second used to graphically establish a weld.

In another aspect of the present invention, the processing unit 104 is adapted to establish at least one drawing of the first and second parts and graphically establish a desired weld associated with the first and second parts on the at least one drawing. The processing unit 104 may automatically establish the at least one drawing. In one embodiment, this is accomplished by the user 110 in conjunction with the GUI 112. For example, as shown in FIG. 9, a drawing of a portion of an assembly 900 is shown. The user 110 (which may be a design engineer or the weld expert) graphically establishes the desired weld by drawing a weld along the desired portions of the drawing 900. As shown, this is indicated by first and second points 902, 904. The user 110 may utilize a user input device such as a mouse or drawing tablet to establish the desired weld.

In another aspect of the present invention, based on the graphically established desired weld, the system 100 may determine information related to the two parts from the database 102, such as dimensions, weight, material, etc. Based on this information, the system 100 may generating the weld instructions or procedures.

In one aspect of the present invention, as discussed below, the design engineer may establish certain weld parameters which are then input using the GUI 112. In another aspect of the present invention, the database 102 includes a data file containing information related to previous or previously approved weld parameters and/or weld procedures. The processing unit 104 may be adapted to access the database and determine a set of suggested weld parameters which then may be modified by the user 110.

In one embodiment, the desired weld is in response to the user 110 drawing a line along an intersection of the first and second parts in the at least one drawing 900.

Figure 2:
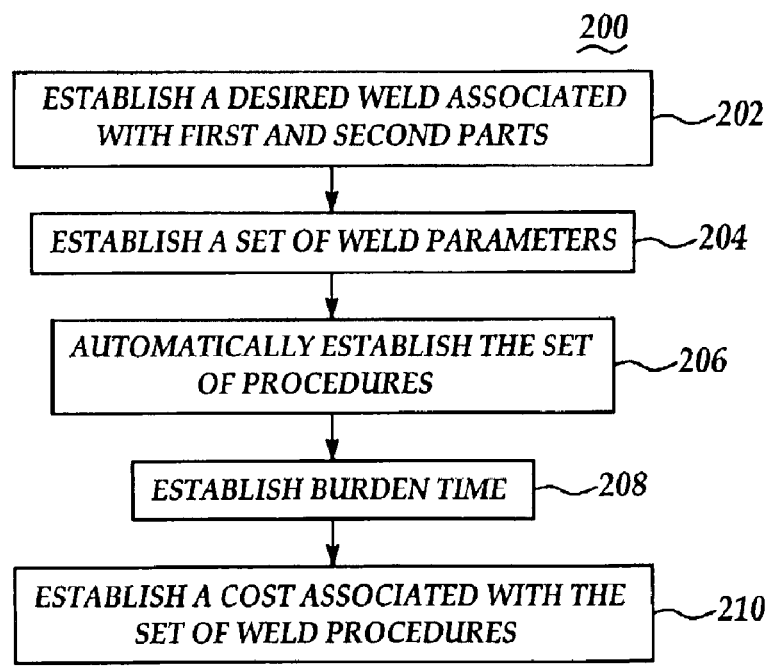
FIG. 2 is a flow diagram of a method for establishing a set of weld procedures, according to an embodiment of the present invention.

With reference to FIG. 2, in another aspect of the present invention, a method 200 of developing a set of weld procedures for welding first and second parts is provided. In a first process step 202, a desired weld associated with the first and second parts is established. In a second process step 204, a set of weld parameters are established as a function of the desired weld. In a third process step 206, the set of weld procedures are automatically established as a function of the desired weld and the weld parameters. In a fourth process step 208, a burden time associated with the set of weld procedures is established. In a fifth process step 210 a cost associated with the set of weld procedures is determined as a function of the burden time.

Figure 3:
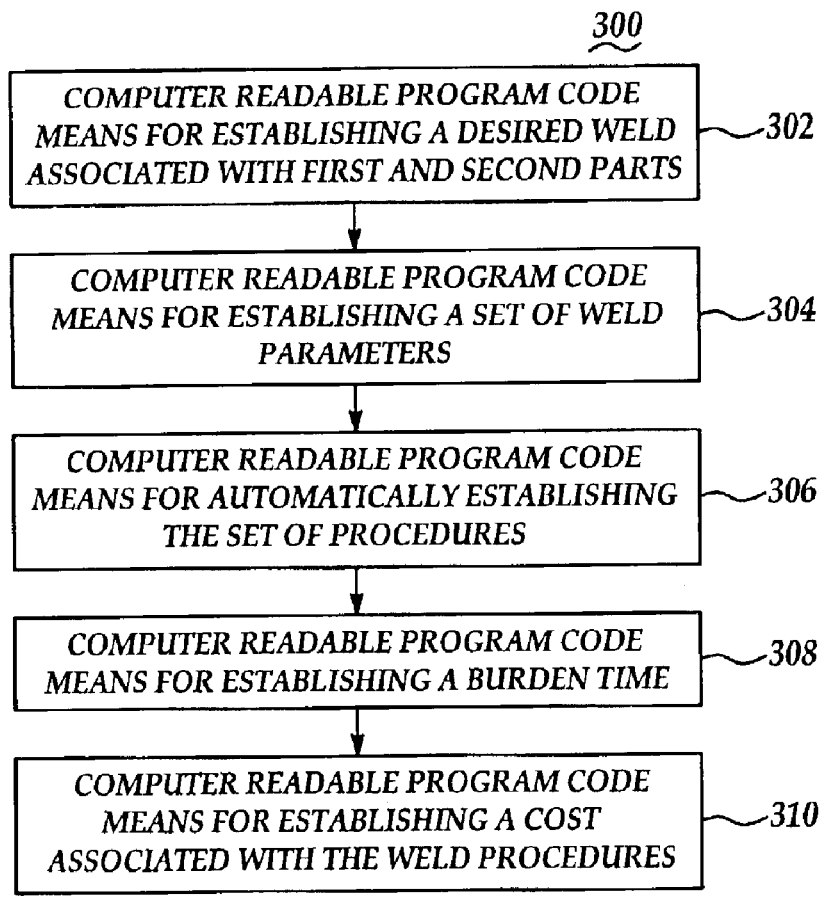
FIG. 3 is a block diagram of a computer program product for establishing a set of weld procedures, according to an embodiment of the present invention.

With reference to FIG. 3, in another aspect of the present invention a computer program product 300 for developing a set of weld procedures for welding first and second parts, is provided. A computer readable program code means 302 establishes a desired weld associated with the first and second parts. A computer readable code means 304 establishes a set of weld parameters as a function of the desired weld. A computer code readable means 306 automatically established the set of weld procedures as a function of the desired weld and the weld parameters. A computer code readable means 306 established a burden time associated with the set of weld procedures. A computer readable program code means establishes a cost associated with the set of weld procedures as a function of the burden time.

Figure 4:
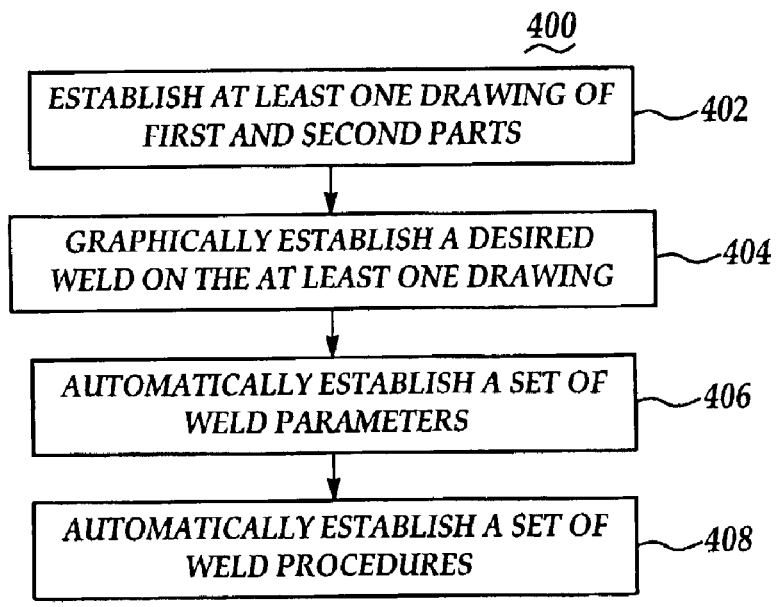
FIG. 4 is a flow diagram of a method for establishing a set of weld procedures, according to another embodiment of the present invention.

With reference to FIG. 4, in still another aspect of the present invention, a method 400 for developing a set of weld procedures for welding first and second parts, is provided. In a first process step 402, at least one drawing of the first and second parts is established. In a second process step 404, a desired weld associated with the first and second parts is graphically established on the at least one drawing. In a third process step 406, a set of weld parameters is automatically established as a function of the desired weld. In a fourth process the set of weld procedures associated with the desired weld and the weld parameters is automatically established.

Figure 5:
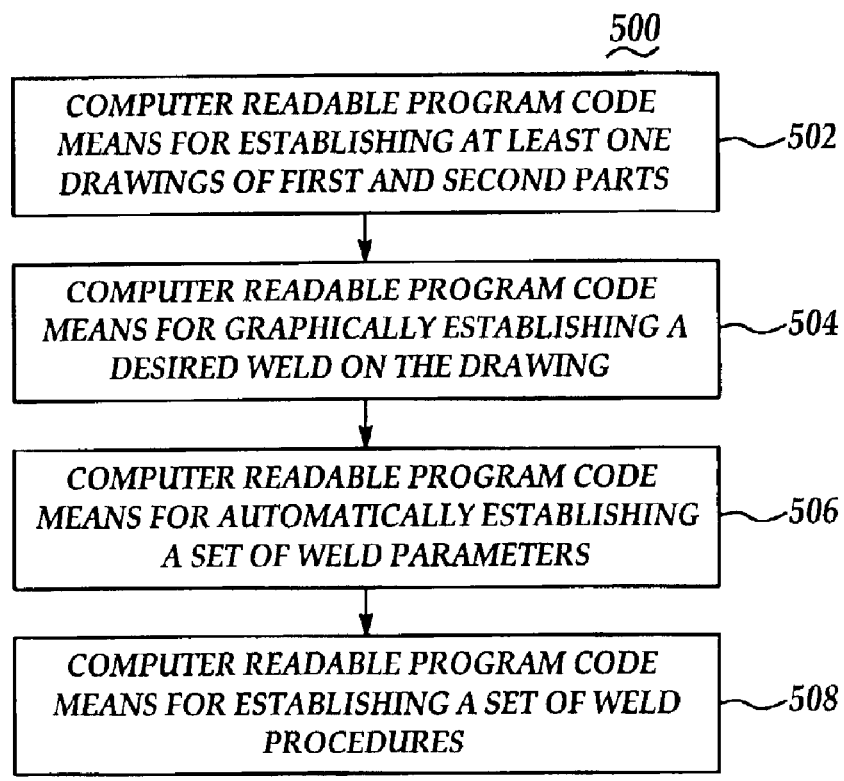
FIG. 5 is a block diagram of a computer program product for establishing a set of weld procedures, according to another embodiment of the present invention.

With reference to FIG. 5, in still another aspect of the present invention, a computer program product 500 for developing a set of weld procedures for welding first and second parts, is provided. The computer program product 500 includes a computer readable program code means 502 for establishing at least one drawing of the first and second parts. A computer readable program code means graphically establishes a desired weld associated with the first and second parts on the at least one drawing. A computer readable program code means 504 automatically establishes a set of weld parameters as a function of the desired weld. A computer readable program code means 506 automatically establishes the a set of weld procedures associated with the desired weld and the weld parameters.

Figure 6:
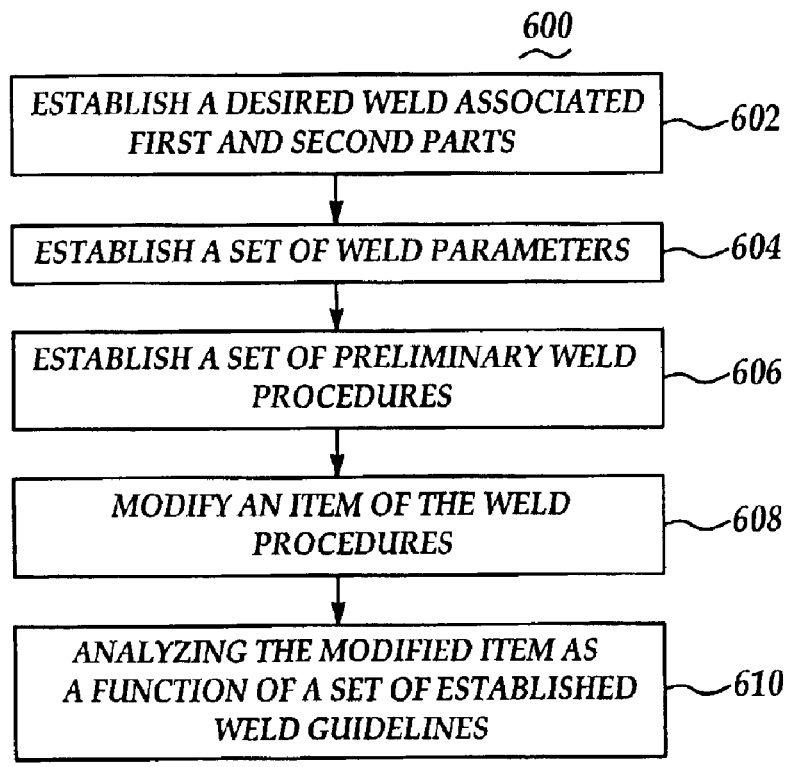
FIG. 6 is a flow diagram of a method for establishing a set of weld procedures, according to still another embodiment of the present invention.

With reference to FIG. 6, in one more aspect of the present invention a method 600 for developing a set of weld procedures for welding first and second parts is provided. In a first process step 602, a desired weld associated with the first and second parts is established. In a second process step 604, a set of weld parameters is established as a function of the desired weld. In a third process step 606, a preliminary set of weld procedures is established as a function of the desired weld and the weld parameters. The set of weld procedures including one or more items. In a fourth process step 608, at least one of the items is modified. In a fifth process step 610, the modified item is analyzed as a function of a set of established weld guidelines. The set of weld procedures may then be generated as a function of the preliminary set of weld procedures and the modified item and the established guidelines.

Figure 7:
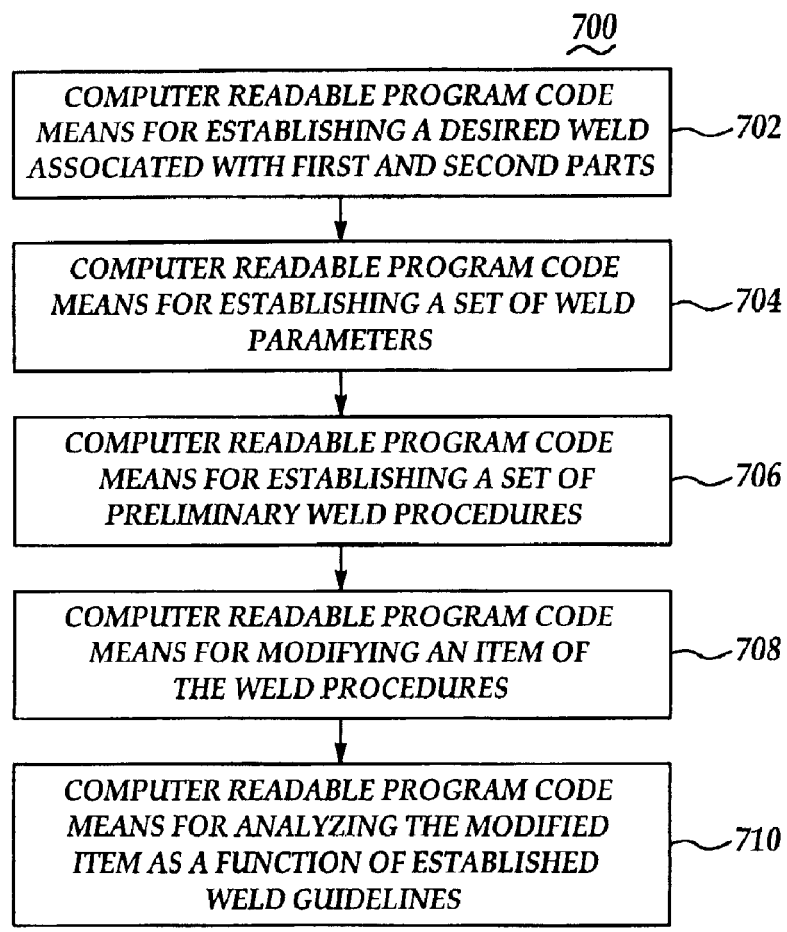
FIG. 7 is a block diagram of a computer program product for establishing a set of weld procedures, according to still another embodiment of the present invention.

With reference to FIG. 7, a computer program product 700 for developing a set of weld procedures for welding first and second parts, is provided. The computer program product 700 includes a computer readable program code means 702 for establishing a desired weld associated with the first and second parts. A computer readable program code means 704 establishes a set of weld parameters as a function of the desired weld. A computer readable program code means 706 establishes a preliminary set of weld procedures as a function of the desired weld and the weld parameters. The set of weld procedures includes one or more items. A computer readable program code means 708 modifies at least one of the items. A computer readable program code means 710 analyzes the modified item as a function of a set of established weld guidelines.

In still another aspect of the present invention, after a calculated weld parameter or weld item is modified, the weld procedures are compared with the weld guidelines (standards or qualified procedures). If the weld procedures meet the weld guidelines they may be approved. Additionally, the modified parameters may be compared with a certified range of parameters. If the parameters are within the given certified range, the weld may be approved.

In still another aspect of the present invention, the system 100 will, after a request to weld two parts, will check the database 102 to determine if the same weld has been done before, e.g., on the same parts in the same location. The database 102 may be used to maintain a repository of previous welds, associated weld information and/or procedures. If the same weld has been previously done, then the system 100 may notify the user 110 and display the stored data (or request if the user 110 wants to see the data). This allows the user 110 to capitalize on the stored data without having to enter data to have the weld procedures generated. Additionally, if the same parts have not been weld previously (or are not in the database 102), the system 100 may search for similar and analogous welds and display the data to the user 110.

With reference to FIGS. 10-15, exemplary portions of the GUI 112 will now be discussed. The GUI 112 allows the user 110 to define the sequences, action items and weld items. Furthermore, the GUI 112 allows the user 112 to establish weld parameters by entering or modifying the weld parameters. The processing unit 104 also performs calculations based on the other entered parameters to derive other parameters.

Figure 10:
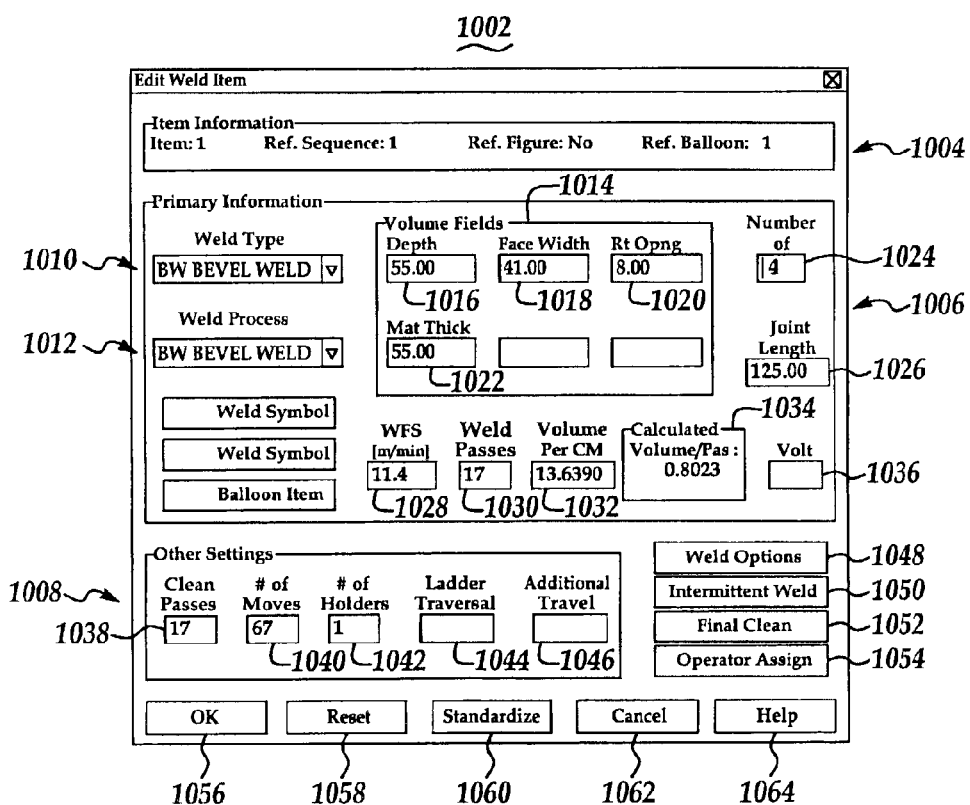
FIG. 10 is a diagrammatic illustration of an edit weld item dialog, according to an embodiment of the present invention.

With specific reference to FIG. 10, an edit weld item dialog 1002 allows the user 110 to define a weld item. The edit weld item dialog 1002 includes an item information section 1004, a primary information section 1006, and an other settings section 1006.

The item information section 1004 provides detailed information regarding the current weld item. In the illustrated embodiment, the item information section 1004 provides the following information: item number, the sequence of which the item is part, the reference figure to which the item refers (if any), and the reference number or balloon to which the item is associated (if any).

The primary information section 1004 allows the user 110 to enter and modify some of the weld parameters, displays calculated weld parameters, and allows the user to modify some of the calculated weld parameters, i.e., provides an override capability. In the illustrated embodiment, the primary information section 1004 includes a weld type drop down list 1010 and a weld process drop down list 1012. The user 110 selects both the desired weld type and the desired weld process from the respective drop down lists 1010, 1012. For example, the weld type could include a bevel weld, a fillet weld, a flared bevel weld, tack (standard and/or heavy). Additionally, the weld process could include a solid wire weld process using a 1.3 mm diameter wire with an Argon shielding gas mix (90% Argon, 10% $CO^2$) and a flex core process with a $CO^2$ shielding gas. It should be noted that the above example of weld processes and weld types is not exhaustive. The actual weld processes and weld types available may vary.

The primary information section 1004 also includes a volume fields section 1014. The volume fields section 1014 allows the user 110 to specify the geometric properties of the weld based on the selected weld type and weld process. The actual volume fields included in the volume fields section 1014 are determines as a function of the selected weld type. In the example shown, the weld type in the weld type drop down list 1010 is bevel weld. When bevel weld is selected the volume fields section 1014 includes a depth entry box 1016, a face width entry box 1018, a root opening entry box 1020, and a material thickness entry box 1022.

In one embodiment, the user 110 enters the desired values for the volume fields in the entry boxes 1016, 1018, 1020, 1022. In another embodiment, the values in the entry boxes 1016, 1018, 1020, 1022 may be calculated and entered automatically by the processing unit 104. For example, the GUI 112 may present the user 110 with a graphical representation of the weld types. After the user 110 selects one of the graphical representations, the values in the volume fields may be automatically entered.

The primary information section 1006 may also include a number of welds entry box 1024 and a joint length entry box 1026. In one embodiment, the user 110 enters the desired weld parameters in the entry boxes 1024, 1026. In another embodiment the values in the entry boxes 1024, 1026 may be calculated and entered automatically by the processing unit 104 based on, for example, the graphically established weld (see above) and the weld type. The same weld may be performed multiple times on the assembly. Each weld may be identified on the image 800 with the same reference number.

The primary information section 1006 may also include a wire feed speed (WFS) entry box 1028, a (total) weld passes entry box 1030, a volume per centimeter entry box 1032, a calculated volume per pass information box 1034, and a volt entry box 1036. The volt entry box 1036 contains a voltage setting associated with the welding equipment to be used and is typically set to a default value, e.g., 31 volts.

The value in the volume per centimeter entry box 1032 is a calculated value based on the weld type and the entered volume feeds. Based on this calculated volume field, the wire feed speed (in millimeters per minute) is determined. Based on a maximum volume per pass and the volume per centimeter the number of weld passes may be determined. The number of weld passes is entered into the weld passes entry box 1020. For example of the maximum volume per pass is 0.8192 and the volume per CM is 12.6390, the number of passes required to perform the weld is 16 (12.6390 divided by 0.8192). Using the calculated number of passes (16), the volume per pass can be calculated by divided the volume per CM by the number of passes. The calculated volume per pass is displayed within the calculated volume per pass information box 1034.

In the illustrated embodiment, the other settings section 1008 includes a clean passes entry box 1038, a # of moves entry box 1040, a # of holders entry box 1042, a ladder traversal entry box 1044, and an additional travel entry box 1048. The information in the other setting sections 1008 may be used to determine a burden associated with the weld. The burden may include a time, material, and/or labor burden.

The number of clean passes is a calculated value based on the total number of clean passes identified by the user 104. The number of moves refers to the number of moves required by the weld. It is directly related to the number of welds and the number of passes. A holder refers to the step of picking up the welding gun and moving toward the first weld. This step is not counted in the burden. So the number of moves equals the number of welds multiplied by the number of passes minus the number of holders.

The value contained in the additional travel entry box 1046 is a value entered by the user 104 and is related to the user's knowledge and expertise regarding the time required to perform the weld.

As shown, the edit weld dialog 1002 may also include a weld options button 1048, an intermittent weld button 1050, a final clean button 1052, and an operator assign button 1054.

The edit weld dialog 1002 may also include an OK button 1056, a reset button 1058, a standardize button 1060, a cancel button 1062, and a help button 1064. Actuation of the OK button 1056 accepts the entered information and adds the weld item to the weld process. Actuation of the reset button 1058 clears any entered information in the edit weld dialog 1002.

As discussed above, the weld edit parameters, either entered or calculated may be modified by the user 104 in the edit weld dialog 1002. Actuation of the standardize button 1060 removes the modifications to the calculated values and re-inserts the (standardized) calculated values.

Actuation of the cancel button 1062 closes the edit weld dialog 1002 without adding a weld item to the weld process.

Actuation of the help button 1064 brings up a help dialog (not shown).

Figure 11:
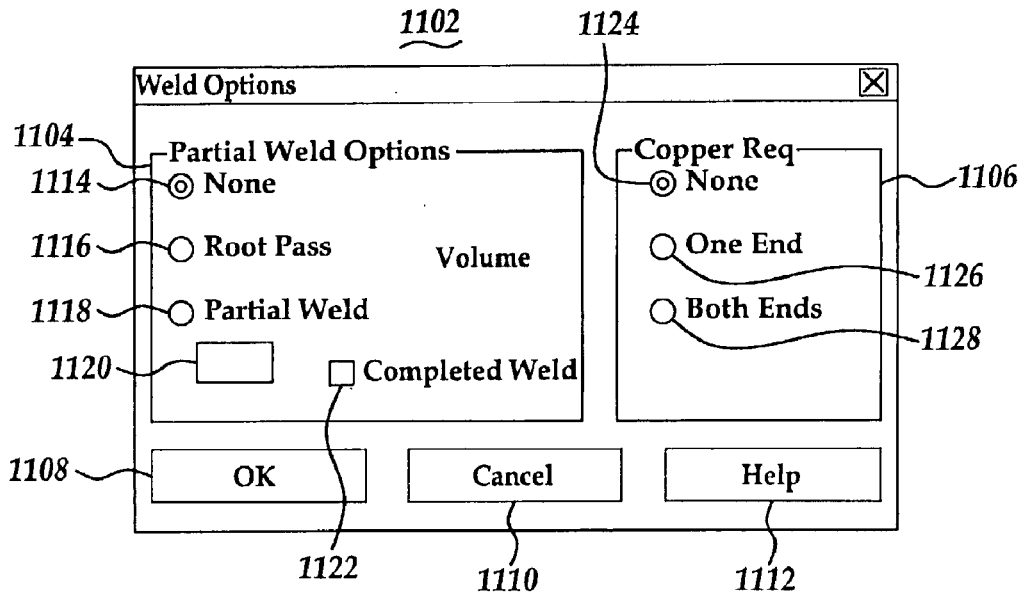
FIG. 11 is a diagrammatic illustration of a weld options dialog, according to an embodiment of the present invention.

With reference to FIG. 11, actuation of the weld options button 1048 displays a weld options dialog 1102. The weld options dialog 1102 allows the user 104 to define the current weld item as a partial weld and/or require a copper stop at the end of the weld defined by the weld item. In the illustrated embodiment, the weld options dialog 1102 includes a partial weld options section 1104, a copper required section 1106, an OK button 1108, a cancel button 1110, and a help button 1112.

The partial weld options section 1104 may include a none selection item 1114, a root pass selection item 1116, and a partial weld selection 118. The user 104 may select one of the selection items 1114, 1116, 1118 to define the current weld item. The partial weld options section 1104 may also includes a partial weld entry box 1120 for entering the percentage of the partial weld.

The partial weld options section 1104 may further include a completed weld check box 1122 (which may be used to inform the weld when the weld is available for cleaning).

The copper required section 1106 may include a none selection 1124, a one end selection 1126, and a both ends selection 1128. These selections 1124, 1126, 1128 allows the user to require copper plugs at none, one or both ends of the current weld item.

Figure 12:
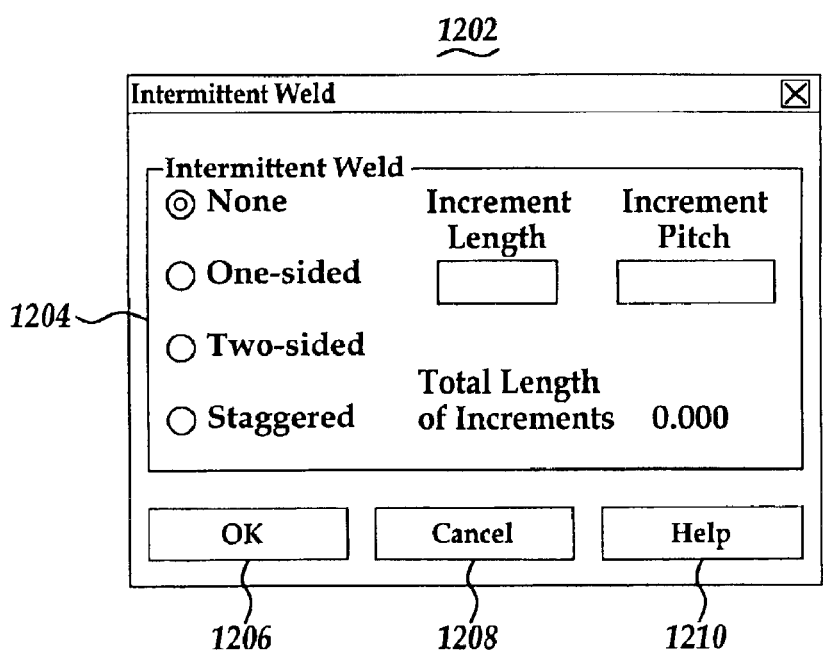
FIG. 12 is a diagrammatic illustration of an intermittent weld dialog, according to an embodiment of the present invention; and, FIG. 13 is a diagrammatic illustration of a weld final clean dialog, according to an embodiment of the present invention.

With reference to FIG. 12, actuation of the intermittent weld button 1050 displays an intermittent weld dialog 1202. The intermittent weld dialog 1202 includes an intermittent weld section 1204, an OK button 1206, a cancel button 1208, and a help button 1210.

In the illustrated embodiment the intermittent weld section 1204 includes a none selection 1212, a one-sided selection 1214, a two-sided selection 1216, and a staggered selection 1218. The selections 1212, 1214, 1216, 1218 allow the user 104 to define the current weld item as an intermittent weld. The intermittent weld section 1204 may also include an increment length entry box 1220 and an increment pitch entry box 1222 which may be used to further define the intermittent weld.

Figure 13:
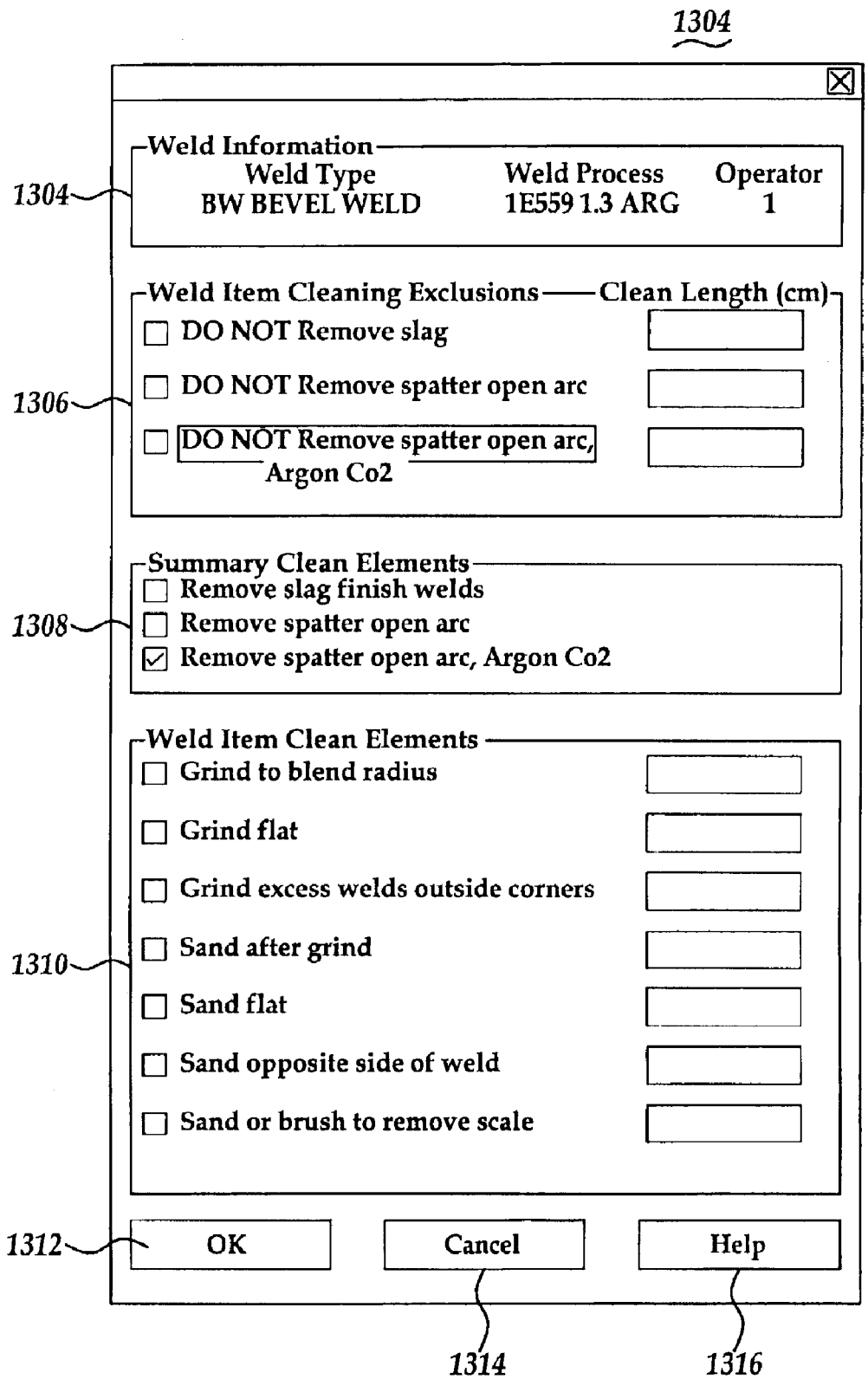

With reference to FIG. 13, actuation of the final claim button 1052 displays a weld final clean dialog 1302. The weld final clean dialog 1302 allows the user 104 to define the final clean requirements for the current weld item. In the illustrated embodiment, the weld final clean dialog 1302 includes a weld information section 1304, a weld item cleaning exclusions section 1306, a summary clean elements section 1308, a weld item clean elements section 1310, an OK button 1312, a cancel button 1314, and a help button 1316.

In the illustrated embodiment, the weld information section 1304 identifies the weld type, the weld process and the operator.

In the illustrated embodiment, the weld item cleaning exclusions section 1306 allows the user to include instructions in the weld process regarding cleaning steps not to be performed, e.g., instruction not to remove slag or spatter. The summary clean elements section 1308 allows the user 104 to include instructions in the weld process regarding cleaning steps to be performed, e.g., instructions to remove slag from finished welds or to remove spatter.

The weld item clean elements section 1310 allows the user to specify how to finish a weld (and the length of the finished segment). In the illustrated embodiment, the user 104 may designate one or more of the following options:

Grind to blend radius,

Grind flat,

Grind excess welds outside corners,

Sand after grind,

Sand flat,

Sand opposite side of weld, and

Sand or brush to remove scale.

Based on the entered or calculated weld parameters, an estimate of the total time required to perform the weld item (and thus the entire weld procedure) may be determined, e.g., based on the number of passes and the number of welds. Additionally, an estimate of the material cost may be determined as a function of the weld parameters.

INDUSTRIAL APPLICABILITY

With reference to the drawings and in operation, the present invention provides a system 100, method 200, 400, 600 and computer program product 300, 500, 700 for developing a set of weld procedures for welding first and second parts together. The first and second parts may be assembled to create a larger assembly. Typically, a designer or design engineer develops the specifications for the assembly. After determining that the first and second parts must be welded together, the designer may include in the specifications, the weld type and other weld parameters of the desired weld.

After the assembly has been designed, a weld expert or user 110 develops a set of weld procedures using the a system 100, method 200, 400, 600 or computer program product 300, 500, 700.

Based on the information provided by the design engineer, the weld expert 110 enters in the weld parameters, e.g., using the GUI 112. Some of the weld parameters may be calculated based on entered parameters. Additionally, some of the parameters may be automatically entered based on the design specifications.

In one aspect of the present invention, the weld procedures may be utilized to establish a burden time associated with the set of weld procedures and establish a cost associated with the set of weld procedures as a function of the burden time. The cost may also be a function of an estimate of the labor costs and an estimate of the material cost.

In another aspect of the present invention, at least one drawings of the first and second parts may be established. The at least one drawing may be obtained from a database of engineering drawings. As discussed above, the weld may be graphically establishing using the at least one drawings.

After the weld procedures are established, the weld procedures may be printed or stored in the database 102. The weld procedures are then used by the operator to perform the weld(s) during assembly.

Other aspect, features, and advantages of the present invention can be obtained from a study of the drawings, the disclosure and the appended claims.

LIST OF ELEMENTS

Title: System and Method for Determining Weld Procedures

FILE: 02-547US 100 system
102 database
104 processing unit
106 computer program application
108 stand-alone computer
110 user or weld expert
112 graphical user interface (GUI)
114 separate depository or data file
116 printer
200 method
202 first process step
204 second process step
206 third process step
208 fourth process step
210 fifth process step
300 computer program product
302 computer readable program code means
304 computer readable program code means
306 computer readable program code means
308 computer readable program code means
310 computer readable program code means 400 method
402 first process step
404 second process step
406 third process step
408 fourth process step
500 computer program product
502 computer readable program code means
504 computer readable program code means
506 computer readable program code means
508 computer readable program code means
600 method
602 first process step
604 second process step
606 third process step
608 fourth process step
610 fifth process step
700 computer program product
702 computer readable program code means
704 computer readable program code means
706 computer readable program code means
708 computer readable program code means
710 computer readable program code means
800 images
800A first image
800B second image
800C third image
900 drawing
902 first point
904 second point
1002 edit weld item dialog
1004 information section
1006 primary information section
1008 other setting section
1010 weld type drop down list
1012 weld process drop down list
1014 volume fields section
1016 depth entry box
1018 face width entry box
1020 root opening entry box
1022 material thickness entry box
1024 number of welds entry box
1026 joint length entry box
1028 wire feed speed (WFS) entry box
1030 (total) weld passes entry box
1032 volume per centimeter entry box
1034 calculated volume per pass information box
1036 volt entry box
1038 clean passes entry box
1040 # of moves entry box
1042 # of holders entry box
1044 ladder traversal entry box
1046 additional travel entry box
1048 weld options button
1050 intermittent weld button
1052 final clean button
1054 operator assign button
1056 ok button
1058 reset button
1060 a standardize button
1062 cancel button
1064 help button
1102 weld options dialog
1104 partial weld options section
1106 copper required section
1108 ok button
1110 cancel button
1112 help button
1114 none selection item
1116 root pass selection item
1118 partial weld selection
1120 partial weld entry box
1022 completed weld check box
1124 none selection
1126 one end selection
1128 both ends selection
1202 intermittent weld dialog
1204 intermittent weld section
1206 ok button
1208 cancel button
1210 help button
1212 none selection
1214 one-sided selection
1216 two-sided selection
1218 staggered selection
1220 increment length entry box
1222 increment pitch entry box
1302 weld final clean dialog
1304 weld information section
1306 weld item cleaning exclusions section
1308 summary clean elements section
1310 weld item clean elements section
1312 ok button
1314 cancel button
1316 help button

What is claimed is:

1. A method for developing a set of weld procedures for welding first and second parts, including the steps of:
 establishing a desired weld associated with the first and second parts;
 establishing a set of weld parameters as a function of the desired weld;
 automatically establishing the set of weld procedures as a function of the desired weld and the weld parameters;
 depicting graphically at least one image of the first and second parts;
 graphically associating a sequence of reference numbers indicative of the set of weld procedures to the at least one image;
 establishing a burden time associated with the set of weld procedures; and,
 establishing a cost associated with the set of weld procedures as a function of the burden time.

2. A method, as set forth in claim 1, wherein the cost is further determined as a function of an estimated material cost and an estimated labor cost.

3. A method, as set forth in claim 1, wherein the step of establishing a desired weld includes the steps of:
 establishing a weld type; and,
 establishing a set of geometric parameters of the desired weld as a function of the desired weld and the weld type.

4. A method, as set forth in claim 3, including the step of determining a number of weld passes as a function of the geometric parameters.

5. A method, as set forth in claim 4, including the step of determining a volume associated with the desired weld as a function of the geometric parameters.

6. A method, as set forth in claim 5, including the step of determining a calculated volume per pass as a function of the number of weld passes and the volume associated with the desired weld.

7. A method, as set forth in claim 1, including the step of establishing an intermittent parameter of the desired weld.

8. A method, as set forth in claim 7, wherein the intermittent parameter is one of none, one-side, two-sided and staggered.

9. A method, as set forth in claim 1, wherein the set of weld parameters includes a weld process type.

10. A method, as set forth in claim 1, wherein the set of weld procedures includes at least one sequence, each sequence having one of a weld item and an action item.

11. A method, as set forth in claim 10, wherein the action item is one of a locate, place, rotate, clean, and finish sub-process.

12. A method, as set forth in claim 1, further including the step of establishing at least one drawing of the first and second parts.

13. A method, as set forth in claim 12, wherein the set of weld procedures includes at least a portion of the at least one drawing of the first and second parts.

14. A method, as set forth in claim 13, wherein the set of weld procedures includes at least one item and the portion of the at least one drawings includes a reference point associated with at least one item.

15. A method, as set forth in claim 1, wherein the set of weld procedures includes at least one item and the method includes the step of establishing an operator to perform the at least one item.

16. A method, as set forth in claim 15, wherein the operator is one of a human operator or a robot operator.

17. A method, as set forth in claim 16, wherein the cost is further determined as a function of an estimated material cost and an estimated labor cost, the estimated labor cost being a function of the established operator.

18. A computer based system for developing a set of weld procedures for welding first and second parts, including:
   a database for storing weld information;
   a processing unit coupled to the database for establishing a desired weld associated with the first and second parts, establishing a set of weld parameters as a function of the desired weld and the weld information, automatically establishing the set of weld procedures as a function of the desired weld and the weld parameters, depicting graphically at least one image of the first and second parts, graphically associating a sequence of reference numbers indicative of the set of weld procedures to the at least one image, and for establishing a burden time associated with the set of weld procedures and establishing a cost associated with the set of weld procedures as a function of the burden time.

19. A system, as set forth in claim 18, wherein the cost is further determined as a function of an estimated material cost and an estimated labor cost.

20. A system, as set forth in claim 18, wherein the processing unit establishes the desired weld by establishing a weld type and establishing a set of geometric parameters of the desired weld as a function of the desired weld and the weld type.

21. A system, as set forth in claim 20, the processing unit being adapted to determine a number of weld passes as a function of the geometric parameters.

22. A system, as set forth in claim 21, the processing unit being adapted to determine a volume associated with the desired weld as a function of the geometric parameters.

23. A system, as set forth in claim 22, the processing unit being adapted to determine a calculated volume per pass as a function of the number of weld passes and the volume associated with the desired weld.

24. A system, as set forth in claim 18, the processing unit being adapted to establish an intermittent parameter of the desired weld.

25. A system, as set forth in claim 24, wherein the intermittent parameter is one of none, one-side, two-sided and staggered.

26. A system, as set forth in claim 18, wherein the set of weld parameters includes a weld process type.

27. A system, as set forth in claim 18, wherein the set of weld procedures includes at least one sequence, each sequence having at least one of a weld item and an action item.

28. A system, as set forth in claim 27, wherein the action item is one of locate, place, rotate, clean, and finish sub-process.

29. A system, as set forth in claim 18, wherein the processing unit establishes at least one drawing of the first and second parts.

30. A system, as set forth in claim 29, wherein the set of weld procedures includes at least a portion of the at least one drawing of the first and second parts.

31. A system, as set forth in claim 30, wherein the set of weld procedures includes at least one item and the portion of the at least one drawings includes a reference point associated with at least one item.

32. A system, as set forth in claim 18, wherein the set of weld procedures includes at least one item, the processing unit being adapted to establish an operator to perform the at least one item.

33. A system, as set forth in claim 32, wherein the operator is one of a human operator or a robot operator.

34. A system, as set forth in claim 33, the processing unit being adapted to further determine the cost as a function of an estimated material cost and an estimated labor cost, the estimated labor cost being a function of the established operator.

35. A computer program product for developing a set of weld procedures for welding first and second parts, comprising:
   computer readable program code means for establishing a desired weld associated with the first and second parts;
   computer readable program code means for establishing a set of weld parameters as a function of the desired weld;
   computer readable program code means for automatically establishing the set of weld procedures as a function of the desired weld and the weld parameters;
   computer readable program code means for depicting graphically at least one image of the first and second parts;
   computer readable program code means for graphically associating a sequence of reference numbers indicative of the set of weld procedures to the at least one image;
   computer readable program code means for establishing a burden time associated with the set of weld procedures; and,
   computer readable program code means for establishing a cost associated with the set of weld procedures as a function of the burden time.

36. A method for developing a set of weld procedures for welding first and second parts, including the steps of:
   establishing at least one drawing of the first and second parts;
   graphically establishing a desired weld associated with the first and second parts on the at least one drawing;
   automatically establishing a set of weld parameters as a function of the desired weld;
   automatically establishing the set of weld procedures associated with the desired weld and the weld parameters; and graphically associating a sequence of reference numbers indicative of the set of weld procedures to the at least one drawing.

37. A method, as set forth in claim 36, wherein the desired weld is established by drawing a line along an intersection of the first and second parts in the at least one drawing.

38. A method, as set forth in claim 36, wherein the at least one drawing is obtained from a depository of engineering drawings.

39. A method, as set forth in claim 36, further including the step of determining a cost associated with the set of weld procedures, an estimated cost and an estimated labor cost.

40. A method, as set forth in claim 36, wherein the step of establishing a desired weld includes the steps of:
   establishing a weld type; and,
   establishing a set of geometric parameters of the desired weld as a function of the desired weld and the weld type.

41. A method, as set forth in claim 40, including the step of determining a number of weld passes as a function of the geometric parameters.

42. A method, as set forth in claim 41, including the step of determining a volume associated with the desired weld as a function of the geometric parameters.

43. A method, as set forth in claim 42, including the step of determining a calculated volume per pass as a function of the number of weld passes and the volume associated with the desired weld.

44. A method, as set forth in claim 36, including the step of establishing an intermittent parameter of the desired weld.

45. A method, as set forth in claim 44, wherein the intermittent parameter is one of none, one-side, two-sided and staggered.

46. A method, as set forth in claim 36, wherein the set of weld parameters includes a weld process type.

47. A method, as set forth in claim 36, wherein the set of weld procedures includes at least one sequence, each sequence having one of a weld item and an action item.

48. A method, as set forth in claim 47, wherein the at least one action item is one of locate, place, rotate, clean, and finish sub-process.

49. A method, as set forth in claim 36, further including the step of establishing at least one drawing of the first and second parts.

50. A method, as set forth in claim 49, wherein the set of weld procedures includes at least a portion of the at least one drawing of the first and second parts.

51. A method, as set forth in claim 50, wherein the set of weld procedures includes at least one item and the portion of the at least one drawings includes a reference point associated with at least one item.

52. A method, as set forth in claim 36, wherein the set of weld procedures includes at least one item and the method includes the step of establishing an operator to perform the at least one item.

53. A method, as set forth in claim 52, wherein the operator is one of a human operator or a robot operator.

54. A method, as set forth in claim 53, wherein the cost is further determined as a function of an estimated material cost and an estimated labor cost, the estimated labor cost being a function of the established operator.

55. A system for developing a set of weld procedures for welding first and second parts, comprising:
   a depository of engineering drawings; and,
   a processing unit coupled to the depository for establishing at least one drawing of the first and second parts, graphically establishing a desired weld associated with the first and second parts on the at least one drawing, automatically establishing a set of weld parameters as a function of the desired weld, automatically establishing the set of weld procedures associated with the desired weld and the weld parameters, and graphically associating a sequence of reference numbers indicative of the set of weld procedures to the at least one drawing.

56. A system, as set forth in claim 55, wherein the desired weld is established in response to a user drawing a line along an intersection of the first and second parts in the at least one drawing.

57. A system, as set forth in claim 56, the processing unit being adapted to determine a cost associated with the set of weld procedures as a function of an estimated cost and an estimated labor cost.

58. A system, as set forth in claim 57, the processing unit being adapted to establish a weld type and to establish a set of geometric parameters of the desired weld as a function of the desired weld and the weld type.

59. A system, as set forth in claim 58, the processing unit being adapted to determine a number of weld passes as a function of the geometric parameters.

60. A system, as set forth in claim 58, the processing unit being adapted to determine a volume associated with the desired weld as a function of the geometric parameters.

61. A system, as set forth in claim 60, the processing unit being adapted to determine a calculated volume per pass as a function of the number of weld passes and the volume associated with the desired weld.

62. A system, as set forth in claim 56, the processing unit being adapted to establish an intermittent parameter of the desired weld.

63. A system, as set forth in claim 62, wherein the intermittent parameter is one of none, one-side, two-sided and staggered.

64. A system, as set forth in claim 56, wherein the set of weld parameters includes a weld process type.

65. A system, as set forth in claim 56, wherein the set of weld procedures includes at least one sequence, each sequence having one of a weld item and an action item.

66. A system, as set forth in claim 65, wherein the action item is one of locate, place, rotate, clean, and finish sub-process.

67. A system, as set forth in claim 56, further including the step of establishing at least one drawing of the first and second parts.

68. A system, as set forth in claim 67, wherein the set of weld procedures includes at least a portion of the at least one drawing of the first and second parts.

69. A system, as set forth in claim 68, wherein the set of weld procedures includes at least one item and the portion of the at least one drawings includes a reference point associated with at least one item.

70. A system, as set forth in claim 56, wherein the set of weld procedures includes at least one item, the processing unit being adapted to establish an operator to perform the at least one item.

71. A system, as set forth in claim 70, wherein the operator is one of a human operator or a robot operator.

72. A system, as set forth in claim 71, wherein the cost is further determined as a function of an estimated material cost and an estimated labor cost, the estimated labor cost being a function of the established operator.

73. A computer program product for developing a set of weld procedures for welding first and second parts, comprising:

computer readable program code means for establishing at least one drawing of the first and second parts;

computer readable program code means for graphically establishing a desired weld associated with the first and second parts on the at least one drawing;

computer readable program code means for automatically establishing a set of weld parameters as a function of the desired weld;

computer readable program code means for automatically establishing the set of weld procedures associated with the desired weld and the weld parameters and computer readable program code means for graphically associating a sequence of reference numbers indicative of the set of weld procedures to the at least one drawing.

* * * * *